2,983,595

PHOSPHORAMIDIC ACID MIXED ANHYDRIDES IN METHOD OF WEED CONTROL

George A. Saul and Joseph W. Baker, Nitro, and Kenneth L. Godfrey, St. Albans, W. Va., assignors to Monsanto Chemical Company, St. Louis, Mo., a corporation of Delaware No Drawing. Filed Feb. 19, 1958, Ser. No. 716,022

4 Claims. (Cl. 71—2.7)

This invention relates to controlling vegetation with mixed anhydrides of mono halogen substituted acetic acids and phosphoramidic acids and to methods of applying such compositions for destroying or controlling vegetation.

An object of the invention is to destroy or control weeds and other undesired vegetation. Another object is to provide herbicidal compositions which destroy or control grasses. A particular object of the invention is to provide herbicidal compositions which destroy or control grasses in pre-emergence application. Another object of the invention is to provide herbicidal compositions which are effective against broadleaf plants. Further objects will be apparent from the detailed description following.

The compositions of the present invention contain as their essential active ingredient a mixed anhydride having the general formula

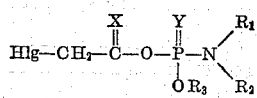

where Hlg represents chlorine, bromine, or iodine, chlorine being preferred because of greater availability and more economical preparation, X and Y represent oxygen or sulfur and may be different but Y is preferably oxygen, $R_1$ and $R_2$ which may be the same or different, represent alkyl or alkenyl radicals, preferably containing more than one but less than six carbon atoms, alkoxyalkyl, alkenoxyalkyl or divalent radicals which together with the nitrogen form a heterocyclic ring, as for example pyrrolidine, morpholine and piperidine. In addition, either $R_1$ or $R_2$ but not both may be aryl. $R_3$ represents lower alkyl, lower alkenyl, alkoxyalkyl or alkenoxyalkyl. Typical examples of $R_1$, $R_2$ and $R_3$ comprise methyl, ethyl, propyl, isopropyl, butyl, isobutyl, sec-butyl, amyl, sec-amyl, allyl, methallyl, 2-butenyl, methoxyethyl, methoxypropyl, ethoxyethyl, ethoxypropyl, vinyloxyethyl, and vinyloxypropyl radicals. The evidence indicates that compounds in which $R_1$ and $R_2$ contain two or three carbon atoms are active at lower dosages than compounds in which $R_1$ and $R_2$ are methyl radicals. There is a possibility of thermal rearrangement in the case of phosphorothionates resulting in anhydrides of the phosphorothiolic acids. If this takes place, such compounds are evidently suitable too.

In co-pending application Serial No. 716,040, filed February 19, 1958, is described a method for preparing the mixed anhydrides of this invention by condensing a haloacetyl halide with a diacyclic phosphoramidate until the theoretical quantity of alkyl halide is evolved. Examples of herbicides which may be prepared in this manner and illustrative but not limitative of the invention include the mixed anhydride of chloracetic acid and ethyl diethylphosphoramidic acid, mixed anhydride of chloracetic acid and ethyl dimethylphosphoramidic acid, the mixed anhydride of chloracetic acid and ethyl dimethylphosphoroamidothionic acid, the mixed anhydride of ethyl morpholinophosphorothionic acid and chloracetic acid, the mixed anhydride of chloracetic acid and ethyl diethylphosphoroamidothionic acid, the mixed anhydride of chloracetic acid and methyl diethylphosphoroamidothionic acid, the mixed anhydride of chloracetic acid and propyl diethylphosphoroamidothionic acid, the mixed anhydride of bromacetic acid and methoxyethyl diethylphosphoramidic acid, the mixed anhydride of chloracetic acid and butoxyethyl diallylphosphoramidic acid, the mixed anhydride of chloracetic acid and methoxyethyl diethylphosphoroamidothionic acid, the mixed anhydride of iodoacetic acid and ethyl diethylphosphoramidic acid and the mixed anhydride of iodoacetic acid and ethyl dipropylphosphoramidic acid.

A method of destroying or controlling undesired vegetation, according to this invention, comprises applying thereto a toxic concentration of the above-defined mixed anhydrides. By applying the toxicants to vegetation is meant any means whereby the toxicant may be applied conveniently in the form of a spray containing the active ingredient in a concentration within the range of 0.1%–10.0% by weight. Thorough coverage of the foliage is effective for contact killing. For pre-emergence control of grasses amounts within the range of ½–60 pounds per acre have been used successfully. Examples of grasses which are controlled are foxtail, cheat grass, brome grass, wild oats and rye grass. Besides exerting highly efficient killing action on grasses (Gramineae) the new toxicants very effectively control pigweed (Amaranthaceae) and members of the family Chenopodiaceae which represents a very prevalent weed family. Tolerance for corn and slight to moderate activity on cotton and radish point up the usefulness of these mixed anhydrides on agricultural crops.

In general, in the application of these compounds, aqueous dispersions or aqueous solutions depending on whether or not the compound is water soluble, will be found most desirable. The dispersions will of course contain a dispersing or wetting agent and the solutions also preferably contain wetting agents to facilitate the spreading of the solution. As dispersing and wetting agents there may be employed soft or hard sodium or potassium soaps, alkylated aromatic sodium sulfonates such as sodium dodecylbenzenesulfonate, or an amine salt of dodecylbenzenesulfonic acid, alkali metal salts of sulfated fatty alcohols, ethylene oxide condensation products of alkyl phenols or tall oil and other dispersing and wetting agents.

The table below illustrates characteristic herbicidal activity of the mixed anhydrides of this invention. The toxicant was emulsified in water and the emulsion applied as a spray. The spray was applied to the ground of seeded plots before the grass or other plants emerged. The amount of the mixed anhydride applied in pounds per acre is recorded together with the phytotoxicity observed. The following phytotoxicity rating key was used:

No phytotoxicity _____ 0
Slight phytotoxicity _____ 1
Moderate phytotoxicity _____ 2
Severe phytotoxicity _____ 3

The plants employed in the test are designated by letter. The plants corresponding to the letters are as follows:

A. Wild oat
B. Brome grass
C. Rye grass (domestic)
D. Buckwheat
E. Mustard (radish)
F. Beet, sugar
G. Cotton
H. Corn
J. Foxtail
K. Barnyard grass
L. Crab grass
M. Pigweed Compound No. 1=Mixed anhydride of chloracetic acid and ethyl diethylphosphoramidic acid Compound No. 2=Mixed anhydride of chloracetic acid and ethyl dimethylphosphoramidic acid.

Compound No. 3=Mixed anhydride of chloracetic acid and ethyl morpholinophosphorothionic acid.

Table I

| Compound No. | Lbs./Acre | Phytotoxicity Rating ||||||||||||
| --- | --- | --- | --- | --- | --- | --- | --- | --- | --- | --- | --- | --- | --- |
| | | A | B | C | D | E | F | G | H | J | K | L | M |
| 1 | 10 | 3 | 3 | 3 | 1 | 1 | 2 | 3 | 0 | 3 | 3 | 3 | 3 |
| | 5 | 3 | 3 | 3 | 0 | 1 | 2 | 0 | 0 | 3 | 3 | 3 | 3 |
| 2 | 25 | 3 | 3 | 3 | 3 | 1 | 1 | 3 | 1 | 0 | 3 | 3 | 3 |
| | 5 | 0 | 3 | 3 | 0 | 0 | 0 | 0 | 0 | 0 | 3 | 3 | 1 |
| 3 | 25 | 3 | 3 | 3 | 2 | 0 | 0 | 3 | 1 | 0 | 3 | 3 | 3 |
| | 5 | 2 | 0 | 2 | 0 | 0 | 0 | 0 | 1 | 0 | 3 | 3 | 1 |

It is intended to cover all changes and modifications of the examples of the invention herein chosen for purposes of disclosure which do not constitute departures from the spirit and scope of the invention.

What is claimed is:

1. The method of destroying vegetation which comprises applying thereto a toxic concentration of a mixed anhydride of the structure

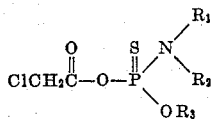

where $R_1$, $R_2$ and $R_3$ represent lower alkyl groups.

2. The method of controlling vegetation which comprises applying thereto a toxic concentration of a mixed anhydride of the structure

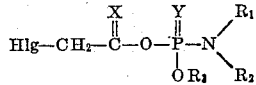

where Hlg represents halogen selected from the group consisting of chlorine, bromine and iodine, X and Y represent a member of the group consisting of oxygen and sulfur, $R_1$ and $R_2$ represent a member of the group consisting of lower alkyl, lower alkenyl, lower alkoxy substituted lower alkyl, lower alkenoxy substituted lower alkyl and divalent radicals which together with the nitrogen form a heterocyclic ring selected from the group consisting of pyrrolidine, morpholine and piperidine and $R_3$ represents a member of the group consisting of lower alkyl, lower alkenyl, alkoxyalkyl and alkenoxyalkyl radicals.

3. The method of controlling vegetation which comprises applying thereto a toxic concentration of a mixed anhydride of the structure

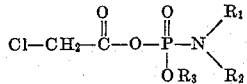

where $R_1$, $R_2$ and $R_3$ represent lower alkyl groups.

4. The method of controlling vegetation which comprises applying thereto a toxic concentration of the mixed anhydride of chloracetic acid and ethyl diethylphosphoramidic acid of the structure

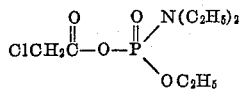

References Cited in the file of this patent

UNITED STATES PATENTS

| 2,648,696 | Whetstone | Aug. 11, 1953 |
| 2,831,015 | Tolkmith | Apr. 15, 1958 |
| 2,848,492 | Saul et al. | Aug. 19, 1958 |